United States Patent [19]

Kanai et al.

[11] Patent Number: 4,479,864

[45] Date of Patent: Oct. 30, 1984

[54] ANODE FOR ELECTROLYSIS OF SEAWATER

[75] Inventors: Hideo Kanai; Akihiro Shinagawa, both of Maebashi; Takahiro Yamazaki, Shibukawa; Reiichi Itai, Maebashi, all of Japan

[73] Assignee: The Japan Carlit Co., Ltd., Tokyo, Japan

[21] Appl. No.: 518,220

[22] Filed: Jul. 28, 1983

[30] Foreign Application Priority Data

Aug. 4, 1982 [JP] Japan ............................. 57-135200

[51] Int. Cl.³ ............................................. C25B 11/06
[52] U.S. Cl. ............................ 204/290 F; 204/290 R; 204/291
[58] Field of Search ............... 204/290 R, 290 F, 291; 427/125, 126.3, 126.5, 229

[56] References Cited

U.S. PATENT DOCUMENTS 3,711,385  1/1973  Beer ................................. 204/290 F
4,233,340  1/1980  Saito et al. ........................ 427/125
4,248,906  2/1981  Saito et al. ........................ 427/128

FOREIGN PATENT DOCUMENTS 771125  11/1967  Canada ............................ 204/290 F
68076   6/1977   Japan ............................. 204/290 F
146887  11/1981  Japan ............................. 204/290 R Primary Examiner—T. Tung
Assistant Examiner—Terryence Chapman
Attorney, Agent, or Firm—Frishauf, Holtz, Goodman & Woodward

[57] ABSTRACT

An anode for generating available chlorine from seawater by electrolysis which comprises a substrate made of titanium or an alloy thereof, and a coating on said substrate which is made up of an active anode material layer containing 15–85 wt % of platinum, 5–35 wt % of iridium dioxide, and 10–15 wt % of ruthenium dioxide. The anode has greatly improved anode performance such as current efficiency, cell voltage, and durability. Therefor, its use for a long period of time becomes possible in any condition of seawater.

4 Claims, 2 Drawing Figures

ELECTROLYSIS PERIOD (DAYS)

ANODE FOR ELECTROLYSIS OF SEAWATER

FIELD OF THE INVENTION

This invention relates to an anode which is suitable for electrolytic generation of hypochlorites from seawater. The invention also relates to an anode for seawater electrolysis which has excellent anode characteristics and adequate durability even in cold seawater. The invention also relates to a process for producing such an anode.

DESCRIPTION OF PRIOR ART

In land-based seawater cooling, there may arise frequent troubles due to marine organism growths and deposits on pipings. To avoid this, chlorination of seawater is successfully carried out by feeding hypochlorites generated by direct electrolysis of seawater. But, in such a process, there are many factors which affect electrolytic performance and anode life. For example, low chloride ion concentration gives rise to a reduction of current efficiency and promotes generation of oxygen instead of useful chlorine. This side reaction practically excludes the use of ruthenium oxide anodes for this purpose, since such ruthenium oxide anodes are known to be particularly susceptible to the environment of oxygen evolution. The lowering temperature of seawater in winter also can cause extreme deterioration of current efficiency and durability of anodes. Furthermore, abrasions due to suspended solids in seawater and the pressure of high speed seawater flows combined can cause mechanical damages such as erosion.

In spite of successful uses of a number of metal anodes in brine electrolysis as in the chlor-alkali industry, the only anodes which have proved fairly durable in seawater electrolysis have been platinum-coated titanium anodes and a few others. Even these anodes are not satisfactory for extended uses on account of the following defects. For example, both an anode coated with a solid solution of ruthenium dioxide and titanium dioxide (see U.S. Pat. No. 3,632,498) and an anode coated with platinum, ruthenium dioxide, palladium oxide, and titanium dioxide (see Japanese Patent No. 1,083,040 —Japanese patent publication No. 55-35473) did not have adequate durability for electrolysis in cold seawater. An anode coated with an alloy of platinum and iridium (see British Patent No. 964,913) was not suitable in such electrolysis owing mainly to its susceptibility to erosion. Even platinum-coated titanium anodes used now, presently give relatively high cell voltages and a current efficiency of less than 80%, thus being unsatisfactory, too. In this way, an improvement in the anode manifesting excellent anodic characteristics and durability in low temperatures has been long sought for in the field of seawater electrolysis for the chlorination of cooling systems in land-based industries.

SUMMARY OF THE INVENTION

An object of this invention is to obtain an anode that is satisfactory for use in seawater electrolysis in all seasons.

Another object of this invention is to obtain an anode that assures a high current efficiency for generating available chlorine in excess of 80% even in cold seawater.

Still another object of this invention is to obtain an anode that has excellent durability against mechanical damage such as erosion and against an environment of oxygen evolution.

Still another object of this invention is to provide a process for producing an anode for seawater electrolysis which has greatly improved durability and characteristics.

Other objects and advantages of the present invention may become apparent to those skilled in the art from the following description and disclosure.

BRIEF DESCRIPTION OF THE DRAWINGS

This invention is further described with reference to the accompanying drawings.

DESCRIPTION OF THE PREFERRED EMBODIMENT

Figure 1:
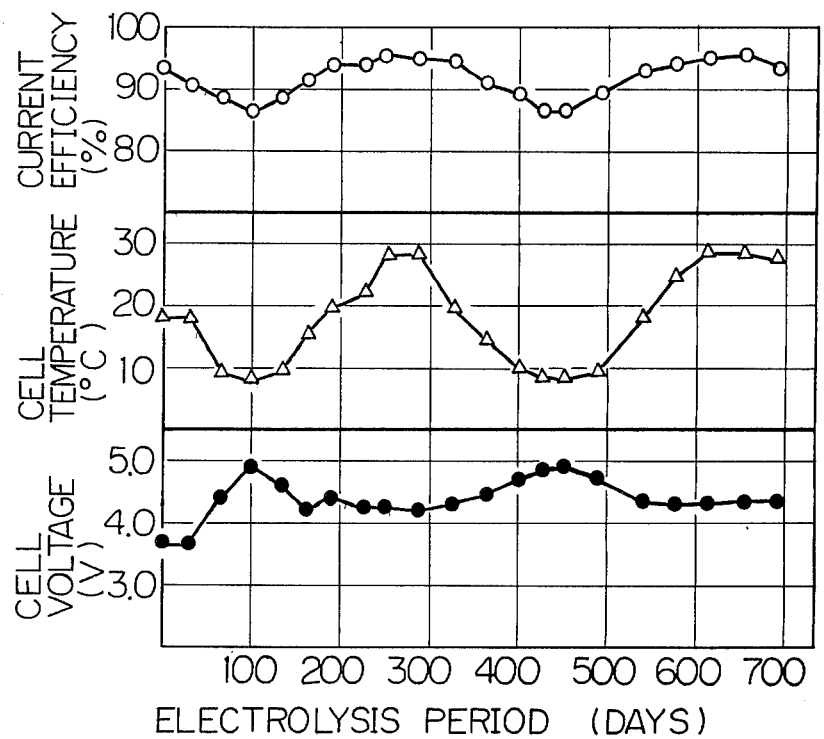
FIG. 1 represents the relationship between the results of using an anode of this invention and operation period (days) of seawater electrolysis.

For the purpose of producing an anode that is satisfactory for use in seawater electrolysis, we have made extensive studies on the anodic characteristics and the durability of anode materials, the combination of coating materials and the operating conditions for producing the anode. As a result, we have found that an anode for seawater electrolysis that has greatly improved anode characteristics in cold seawater and that has excellent durability against mechanical damages and an environment of oxygen evolution can be produced by forming a coating made of the following preferred contents: platinum, iridium dioxide, and ruthenium dioxide as an anode active material.

Therefore, this invention relates to an anode for seawater electrolysis which has on a substrate made of titanium or its alloy a coating made of platinum (15–85 wt %), iridium dioxide (5–35 wt %), and ruthenium dioxide (10–50 wt %) formed by heating a layer of an organic solution containing the halides of said metals applied onto said substrate either by brushing or by immersion or by any other known method of application. The invention also relates to a process for producing such an anode.

The substrate used in this invention is made of titanium or a titanium alloy such as titanium-palladium of commercial grades in the form of sheets, wire, screens, bars, or any other shapes desired.

Within the limits of the composition of the coating materials of this invention, the advantageous properties of each component of the coating materials can be effectively exhibited and can sufficiently make up for weak points manifested by the other components. Namely, more than 15 wt % of platinum increases oxygen overvoltage and durability as well, while preventing the deterioration of the current efficiency for generating available chlorine in cold seawater. Likewise, more than 5 wt % of iridium dioxide prevents deterioration of the current efficiency in cold seawater and improves durability against oxygen and mechanical stability against erosion. Furthermore, more than 10 wt % of ruthenium dioxide causes both a lowering of chlorine overvoltage and an increase in mechanical strength.

Even if an anode for seawater electrolysis is coated with the same materials as specified by this invention but with a composition detached from the preferable ranges of this invention, the electrolytic performances such as current efficiency, cell voltages, and durability will become insufficient. Namely, platinum contained in an amount of more than 85 wt % results in a decrease in the current efficiency and rise in the cell voltage, whereas platinum contained in an amount less than 15 wt % causes an excessively lowered oxygen overvoltage, an increase deterioration of the current efficiency in cold seawater, and a reduced durability. If the content of iridium dioxide exceeds 35 wt %, the oxygen overvoltage begins to decline, thus lowering current efficiency. On the other hand, if the content of iridium dioxide is less than 5 wt %, then the deterioration of current efficiency, especially in cold seawater, and the lack of durability against oxygen becomes remarkable. Furthermore, ruthenium dioxide contained in an amount of more than 50 wt % results in an excessive decrease in current efficiency and durability for electrolysis in cold seawater, whereas ruthenium dioxide contained in an amount less than 10 wt % lowers both erosion resistance and current efficiency.

The role played by each component of the coating layer in improving the anode performance has not been fully explained, but as far as we know, the high oxygen overvoltage characteristics of metallic platinum combines synergistically with the low chlorine overvoltage characteristics of iridium dioxide and ruthenium dioxide to increase the difference between the oxygen evolving potential and the chlorine evolving potential, thus increasing the current efficiency. Furthermore, the increment of mechanical strength can most certainly be attributed to the excellent hardness of iridium and ruthenium oxides, and the improvement of anode performance in cold seawater that is achieved appears to have been derived from the low temperature electrode characteristics of platinum and iridium dioxide and from the durability characteristics of iridium dioxide in oxygen environments. Furthermore, the low cell voltage characteristics obtained are probably derived from the high conductivity of each component as well as the low chlorine overvoltage characteristics of ruthenium dioxide.

The anode of this invention is produced by the following procedure. A titanium or titanium alloy substrate is degreased with an organic solvent such as trichloroethylene and ethylene chloride, and after being roughened by a sandblast treatment, is surface washed with acid. On the surface of this substrate, a coating consisting of metallic platinum, iridium dioxide and ruthenium dioxide within the preferred range of composition is formed by a heating method. The coating is made of a platinum halide selected from the group consisting of platinum dichloride, platinum tetrachloride, hexachloroplatinic acid, and platinum tetraiodide, an iridium halide selected from the group consisting of iridium monochloride, iridium trichloride, iridium tetrachloride, iridium tetrabromide, and hexachloroiridic acid and a ruthenium halide selected from the group consisting of ruthenium dichloride and ruthenium trichloride. As the solvent to dissolve these halides, isopropyl alcohol, n-butyl alcohol, and amyl alcohol can be used. A combination of hexachloroplatinic acid, iridium tetrachloride, ruthenium trichloride and isopropyl alcohol is most preferred on account of the suitable solubility relationship. The following description assumes the use of these halides as the material for coating.

The coating is formed by applying hexachloroplatinic acid, iridium tetrachloride, and ruthenium trichloride dissolved in isopropyl alcohol on to the surface treated substrate, drying, and then heat treating. The solution is adjusted so that each component after heat treatment might fall within the preferred range of composition of this invention. An example of solution makeup is as follows; First, 6.6 parts by weight of hexachloroplatinic acid, 1.2 parts by weight of iridium tetrachloride and 1.0 part by weight of ruthenium trichloride are weighed, mixed, and added to 40 parts by weight of isopropyl alcohol to dissolve. In order to accelerate dissolution, 2–6 parts by weight of hydrochloric acid may be added. Similarly, to prevent excessive oxidation, a reducing agent such as anise oil or lavender oil can also be effectively used. This solution is applied to the pre-treated substrate by painting or immersing, and then dried. After drying, the unit is heated in an electric oven at 450°–500° C. for 20 to 90 minutes. The cycle of application, drying, and heating is repeated until a desired metal loading is obtained. The preferable range of the metal loading or the total weight of the platinum group metals per unit active area of the anode is between 5 and 60 g/m$^2$.

The anode produced in compliance with this invention can be used with particular advantage for generating available chlorine from seawater by electrolysis. However, it can equally well be used for electrolysis of diluted brine at a concentration similar to seawater for a wide area of applications including disinfection of city water, swimming pools, and sewage.

When used for electrolysis of seawater, the anode of this invention can give a current efficiency in excess of 80 percent even at a low temperature. This, in combination with a low cell voltage, allows an electric power consumption reduced by one-third of that required for a conventional platinum-coated titanium anode. Also due to its resistance against mechanical wear, such as erosion, and to its electrochemical stability, it was recognised that it permit continuous operation for over 1.5 years. Moreover, the process for producing the anode of this invention has proved economical, since the producing procedure is simple and requires less platinum group metals than the electroplating process for making conventional platinum-plated titanium anodes. These advantages obtained in practical production are much greater than those obtained formerly, and hence the process of this invention is highly valuable as an industrial means.

This invention is now described in greater detail by reference to the following examples which are given here for illustrative purposes only and are by no means intended to limit the scope of the invention.

EXAMPLE 1

A titanium sheet measuring 155 mm × 400 mm × 3 mm was degreased in a degreasing apparatus containing trichloroethylene. The surface of the titanium sheet was roughened by sandblast treatment and then washed by immersion in a 5% hydrofluoric acid solution, followed by a water wash. A coating solution, the composition of which is shown below, was prepared by mixing in the order listed. The solution was applied to the titanium substrate with a brush and then dried.

| Composition of coating solution | |
|---|---|
| 1. Hexachloroplatinic acid | 6.6 g |

-continued

| Composition of coating solution | |
|---|---|
| 2. Iridium tetrachloride | 1.2 g |
| 3. Ruthenium trichloride | 1.0 g |
| 4. Hydrochloric acid | 5.0 ml |
| 5. Isopropyl alcohol | 40 ml |
| 6. Lavender oil | 10 ml |

The unit was transferred into an electric oven where it was heated in air at 500° C. for 1 hour. The cycle of application, drying and heating was repeated seven times.

Analysis of the composition of the coating layer with an X-ray diffractometer gave 65 wt % metallic platinum, 20 wt % iridium dioxide and 15 wt % ruthenium dioxide. Measurements of the thickness of the coating with an RI fluorescent X-ray spectrometer (source : plutonium 238 ; Measuring time : 40 seconds) gave a metal loading of 30 g/m².

EXAMPLE 2

An anode prepared as in Example 1 was used for electrolysis of seawater under the following conditions. The results are shown in FIG. 1.

| Electrolysis conditions | |
|---|---|
| Electrolyte | seawater |
| Electrolyte temperature | 8-28° C. |
| Anode current density | 10 A/dm² |
| Flow rate of electrolyte | 20 l/min |

No abnormal increase in the cell voltage was observed during the electrolysis which lasted for one year and eleven months. Likewise, no abnormal decrease in current efficiency took place.

For the purpose of comparison, a platinum-plated titanium electrode and a titanium anode coated with ruthenium dioxide and titanium dioxide were used in the electrolysis of seawater under the same conditions as for the anode of Example 1 the results being shown in Table 1 below:

TABLE 1

| | Seawater temp. (°C.) | Cell voltage (V) | Current efficiency (%) | Average power consumption (kWh/kg. $Cl_2$) | Test period (days) | Remarks |
|---|---|---|---|---|---|---|
| Anode of Example 1 | 8-28 | 3.7-5.0 (4.5) | 86-95 (91) | 3.7 | 696 | |
| Pt-plated Ti anode | " | 4.8-5.6 (5.2) | 72-75 (73) | 5.4 | 720 | |
| Titanium Anode with $RuO_2$ (40 mol %) $TiO_2$ (60 mol %) coating | " | 3.9-7.0 (4.8) | 67-94 (75) | 4.8 | 200 | The anode life terminated. |

Note:
The figures in parentheses are averages.

As shown in Table 1, the anode of Example 1 gave an average current efficiency higher than 90% over the whole duration of electrolysis, the current efficiency at low temperature periods being kept higher than 85%.

COMPARATIVE EXAMPLE 1

Figure 2:
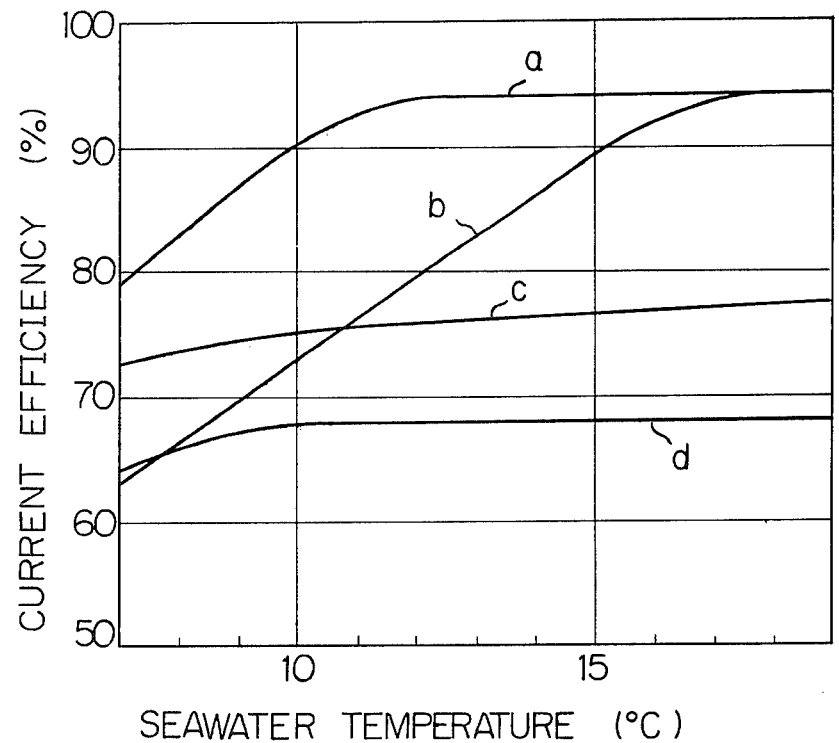
FIG. 2 represents the relationship between a given temperature of seawater and current efficiency for available chlorine obtained with an anode of this invention as compared with other conventional anodes.

An anode prepared as in Example 1 was compared with other types of anode in the electrolysis of seawater. The relationship obtained between temperature of seawater and current efficiency is shown in FIG. 2.

Curves a, b, c and d represent the anode prepared as in Example 1, a titanium anode coated with ruthenium dioxide and titanium dioxide, a platinum-plated titanium anode and an iridium dioxide-coated titanium anode, respectively. The anode coated with ruthenium dioxide (40 mol %) and titanium dioxide (60 mol %) showed lower current efficiencies at lower temperatures and the temperature at which a drop of current efficiency was observed was higher than the others.

The Platinum-coated titanium anode and the titanium anode coated with iridium dioxide showed little decrease in current efficiency with lowering temperature but its values were as low as 75% (9.5° C.) and 66% (8.5° C.), respectively. In contrast, the anode of this invention showed little decrease in current efficiency during the low temperature operations and still maintained a current efficiency of more than 80% even at a temperature of 8° C.

COMPARATIVE EXAMPLE 2

In order to examine the validity of the preferred range of composition of the anode coatings of this invention, various specimens having a composition shown in Table 2 were prepared and were subjected to the electrolysis of seawater at anode current density: 20 A/dm².

The results are shown in Table 2 below.

TABLE 2

| Sample No. | Composition of coating (wt %) | | | Sea water (°C.) | Flow rate of sea water (m/sec) | Cell voltage (V) | Current efficiency (%) | Test period (days) | Appearance |
|---|---|---|---|---|---|---|---|---|---|
| | Pt | $IrO_2$ | $RuO_2$ | | | | | | |
| 1 | 65 | 20 | 15 | 10-17 | 0.8 | 4.8-5.6 | 86-94 | 90 | No change |
| 2 | 15 | 20 | 65 | 10-15 | " | 4.9-7.5 | 75-90 | 70 | The surface coat thinned. |
| 3 | 15 | 70 | 15 | 10-17 | " | 5.0-5.7 | 74-76 | 90 | No change |
| 4 | 90 | 5 | 5 | " | " | 5.3-6.0 | 75-76 | " | A trace of erosion was |

TABLE 2-continued

| Sample No. | Composition of coating (wt %) | | | Sea water (°C.) | Flow rate of sea water (m/sec) | Cell voltage (V) | Current efficiency (%) | Test period (days) | Appearance |
| --- | --- | --- | --- | --- | --- | --- | --- | --- | --- |
| | Pt | IrO$_2$ | RuO$_2$ | | | | | | |
| | | | | | | | | | detected. |

Satisfactory results were obtained with Anode-1 of which the coating composition was within the preferred range.

But with Anode-2 through 4 of which the coating composition was outside the preferred range, only very low current efficiencies were obtained. In particular, Anode-2 showed a remarkable decrease in current efficiency at a low temperature and an increase in the cell voltage as well.

These experiments were conducted at an elevated seawater flow rate of 0.8 m/s to accelerate the process of mechanical deterioration.

At this flow rate, Anode-4 showed traces of erosion after 90 days.

EXAMPLE 3

A titanium-palladium alloy sheet measuring 50 mm × 150 mm × 3 mm was degreased by ethylene chloride. The surface was roughened by sandblast treatment. The sheet was then immersed in a hot oxalic acid solution for 1 hour and washed with water.

A coating solution the composition of which is shown below was prepared by mixing in the order listed. The solution was applied to the titanium-palladium alloy substrate with a brush and then dried.

| Composition of coating solution | |
| --- | --- |
| 1. Platinum tetrachloride | 657 mg |
| 2. Hexachloroiridic acid | 408 mg |
| 3. Ruthenium trichloride | 381 mg |
| 4. Hydrochloric acid | 0.6 mg |
| 5. N—butyl alcohol | 8.0 mg |
| 6. Anise oil | 1.0 mg |

The unit was transferred into an electric oven where it was heated in air at 480° C. for 1.5 hours. The cycle of application, drying and heating was repeated ten times.

Analysis of the composition of the coating layer with an X-ray diffractometer gave: 40 wt % metallic platinum, 30 wt % iridium dioxide and 30 wt % ruthenium dioxide.

Measurement of the thickness of the coating with an RI fluorescent X-ray spectormeter gave a metal loading of 50 g/m$^2$.

This anode was used for electrogeneration of hypochlorite as a sterilization agent for a swimming pool. The results are shown in Table 3. For the purpose of comparison, the results using a normal platinum-plated titanium anode are also shown in Table 3.

Available chlorine of which the concentration was 8,000 ppm was continuously obtained from 3% brine. No abnormal increase in the cell voltage and no change of surface was observed during the electrolysis which lasted for one year and it was possible to do stable electrolysis.

EXAMPLE 4

A titanium sheet measuring 155 mm × 400 mm × 3 mm was degreased in a degreasing apparatus containing trichloroethylene. The surface was roughened by sandblast treatment and then washed by immersion in a 5% hydrofluoric acid solution, followed by a water wash.

A coating solution the composition of which is shown below was prepared by mixing in the order listed.

The solution was applied to the titanium substrate with a brush and then dried.

| Composition of coating solution | |
| --- | --- |
| 1. Hexachloroplatinic acid | 4.9 g |
| 2. Hexachloroiridic acid | 0.9 g |
| 3. Ruthenium trichloride | 2.5 g |
| 4. Hydrochloric acid | 5.0 ml |
| 5. Isopropyl alcohol | 40 ml |
| 6. Lavender oil | 10 ml |

The unit was transferred into an electric oven where it was heated in air at 500° C. for 1 hour. The cycle of application, drying and heating was repeated seven times.

Analysis of the composition of the coating layer with an X-ray diffractometer gave: 50 wt % metallic platinum, 10 wt % iridium dioxide and 40 wt % ruthenium dioxide.

Measurement of the thickness of the coating with an RI fluoresent X-ray spectrometer gave a metal loading of 30 g/m$^2$.

This anode was used for electrolysis of seawater under the same conditions as Example 2.

No abnormal increase in the cell voltage was observed during the electrolysis which lasted for one year and six months. Likewise, no abnormal decrease in current efficiency took place.

What is claimed is:

1. An anode for generating available chlorine from seawater by electrolysis which comprises a titanium or titanium alloy substrate having an outer active anode coating on said substrate, said outer coating consisting essentially of an active anode layer containing from 15 to 85% by weight of platinum, from 5 to 35% by weight

TABLE 3

| | Electrolyte | cell temp. (°C.) | current density (A/dm$^2$) | cell voltage (V) | effective Cl$_2$ (ppm) | current efficiency (%) | power consumption (kWh/kg · Cl$_2$) |
| --- | --- | --- | --- | --- | --- | --- | --- |
| Anode of Example 3 | 3% NaCl | 30 | 10 | 3.5 | 8,000 | 84 | 3.1 |
| Pt-plated Ti anode | 3% NaCl | " | " | 4.8 | 6,000 | 54 | 6.7 | of iridium dioxide and from 10 to 50% by weight of ruthenium dioxide.

2. The anode according to claim 1 wherein said coating is integral with said substrate and has a metal loading of 5-60 g/m$^2$ expressed as the total weight of platinum group metals per unit active area of the anode.

3. The anode according to claim 2 wherein said substrate consists essentially of titanium and is integral with said outer active coating.

4. The anode according to claim 1 wherein said substrate consists essentially of titanium and is integral with said outer active coating.

* * * * *